(12) United States Patent
Vayanos

(10) Patent No.: US 6,505,122 B1
(45) Date of Patent: Jan. 7, 2003

(54) METHOD AND APPARATUS FOR PROVIDING ACCURATE POSITION ESTIMATES IN INSTANCES OF SEVERE DILUTION OF PRECISION

(75) Inventor: Alkinoos H. Vayanos, San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 0 days.

(21) Appl. No.: 09/922,472

(22) Filed: Aug. 3, 2001

Related U.S. Application Data

(60) Provisional application No. 60/300,960, filed on Jun. 25, 2001.

(51) Int. Cl.[7] .................................................. G01S 5/00
(52) U.S. Cl. .................................. 701/213; 342/357.01
(58) Field of Search ................................. 701/213, 215, 701/225, 200; 342/357.01, 357.02, 357.06, 357.08, 357.11

(56) References Cited

U.S. PATENT DOCUMENTS

| | | | | |
|---|---|---|---|---|
| 5,615,116 A | * | 3/1997 | Gudat et al. ................ 180/167 |
| 5,802,492 A | * | 9/1998 | DeLorme et al. ........... 340/990 |
| 5,848,373 A | * | 12/1998 | DeLorme et al. ........... 340/990 |
| 6,052,647 A | * | 4/2000 | Parkinson et al. ...... 342/357.06 |
| 6,208,297 B1 | * | 3/2001 | Fattouche et al. .......... 342/450 |
| 6,246,361 B1 | * | 6/2001 | Weill et al. ............. 342/357.01 |
| 6,331,835 B1 | * | 12/2001 | Gustafson et al. ...... 342/357.01 |
| 6,351,711 B1 | * | 2/2002 | Chansarkar ................. 701/213 |

\* cited by examiner

*Primary Examiner*—William A. Cuchlinski, Jr.
*Assistant Examiner*—Olga Hernandez
(74) *Attorney, Agent, or Firm*—Philip Wadsworth; Charles D. Brown; Kevin Cheatham

(57) ABSTRACT

Techniques for providing an improved position estimate for a device in instances of relatively large dilution of precision. In a method, position estimates for a number of transmitters (e.g., GPS satellites and/or base stations) and a set of initial measurements (e.g., pseudo-ranges) are initially received. An Update Vector for a current device position estimate is computed. Non-convergence of the current device position estimate toward a target position estimate is detected and, if true, the Update Vector is adjusted (e.g., reduced in magnitude by a scaling factor) to increase the likelihood of convergence to the target position estimate. The current device position estimate is then updated based on the (possibly adjusted) Update Vector. Non-convergence may be detected based on the number of iterations performed without reaching the target position estimate and/or phase reversal in two consecutive Update Vectors. The scaling factor may be increased with each detected event indicative of non-convergence.

29 Claims, 5 Drawing Sheets

METHOD AND APPARATUS FOR PROVIDING ACCURATE POSITION ESTIMATES IN INSTANCES OF SEVERE DILUTION OF PRECISION

RELATED APPLICATIONS

This application claims priority to U.S. Provisional Application No. 60/300,960, filed Jun. 25, 2001.

BACKGROUND

1. Field

The present invention relates generally to position determination, and more specifically to a method and apparatus for improving estimating the location of a device under unfavorable dilution of precision (DOP) conditions.

2. Background

A common means by which to locate a device is to determine the amount of time required for signals transmitted from multiple sources at known locations to reach the device. One system that provides signals from a plurality of transmitters of known locations is the well-known Global Positioning Satellite (GPS) system. Satellites in the GPS system are placed in precise orbits according to a GPS master plan. The position of the GPS satellites can be identified by different sets of information transmitted by the satellites themselves. Another system that provides signals from transmitters (i.e., base stations) of known earth-bound locations is a wireless (cellular) communication system.

Signals from satellites and/or base stations may be used to determine the location of a device. By receiving and processing the signals transmitted from these transmitters, the amount of time required for the signals to travel from the transmitters to the device may be measured and used to compute the distances (or ranges) between the transmitters and the device. The signals themselves may further include information indicative of the locations of the transmitters. By accurately measuring the distances from three or more transmitters at known locations, the device can "trilaterate" its position. For example, when range measurements are available, a measurement surface may be determined for each transmitter, with the surface originating at the transmitter's location and having a curvature determined by the range from the transmitter to the device. The intersection of three or more such measurement surfaces would then be the estimated position of the device.

The ranges to the transmitters and their locations are conventionally provided to an algorithm that operates on the data to provide a position estimate for the device. This algorithm is typically a least mean square (LMS) algorithm that performs a number of iterations to arrive at a final solution for the device's position estimate. If provided with "good" range and transmitter location data, the LMS solution asymptotically converges toward a target "optimal" solution with each iteration, and the LMS algorithm may be terminated when the LMS solution is within a particular tolerance of the target solution.

In certain circumstances, the LMS algorithm does not converge toward the target solution. These circumstances typically arise due to a large "dilution of precision" (DOP) around the device location, which may result from having inaccurate range data and/or poor geometry for the transmitter and device locations. As an example, if the transmitters are located in close proximity relative to the distance to the device, then the measurement surfaces for these transmitters may intersect at a small angle (i.e., the surfaces are close to parallel as oppose to being more slanted toward perpendicular). In this case, a small error in the range measurements would result in a large error in the point of intersection, and thus a corresponding large error in the estimated location of the device. In one especially case of very large DOP, the measurement surfaces do not intersect, which then results in bad geometry and large errors at the optimal position estimate for the device.

The likelihood of obtaining bad geometry increases when earth-bound measurements are used (exclusively or in conjunction with satellite measurements) to estimate the position of the device. Earth-bound measurements may be made from signals transmitted from base stations of a wireless communication system and received at the device or signals received at the base stations from the device. The distances from the device to the base stations are shorter than those to the satellites, and the curvature of the earth-bound measurement surfaces is larger, which then increases the likelihood that the measurement surfaces do not intersect.

Conventionally, solutions obtained in cases of bad geometry are discarded. This may be due to a combination of non-convergence by the LMS algorithm and/or reduced likelihood of obtaining the desired accuracy in the LMS solutions. However, in many instances, such as 911 emergency services, these solutions are beneficial and should be reported if they can be obtained.

There is therefore a need in the art for techniques to provide position estimate with improved likelihood of having the desired accuracy in cases of large DOP.

SUMMARY

Aspects of the invention provide techniques to derive an improved position estimate for a receiver device (i.e., a "Device Position Estimate") in cases of large "dilution of precision" (DOP). The Device Position Estimate, "Actual Measurement Vectors" and "Transmitter Position Estimates" are provided to an iterative algorithm (e.g., an LMS algorithm) that is initially operated in a normal manner. In cases of large DOP, the solutions from the algorithm may not converge toward a target solution, but may instead oscillate (i.e., overshoot) around the target solution. A method and apparatus is disclosed herein to determine when convergence is unlikely and to adjust the algorithm to increase the likelihood of convergence. Accordingly, the disclosed method and apparatus frequently increases the accuracy of the final solutions calculated in cases of large DOP.

A determination that the LMS algorithm is unlikely to converge may be made based on: (1) the number of iterations performed without determining that the algorithm has converged to a final solution (hereafter referred to as the "target solution"), (2) phase reversal in an "Update Vector" used to update the Device Position Estimate, or (3) a combination of these parameters.

One embodiment of the disclosed method determines the Transmitter Position Estimates for a number of transmitters (e.g., GPS satellites and/or base stations) determines an "Actual Measurement Vector" by making measurements, and calculates a "Calculated Measurement Vector" related to the distance between a current device and each transmitter (e.g., the pseudo-ranges to the transmitters that would result from the transmission of signals between the current device and each transmitter). In addition, a "Residual Measurement Error Vector" is calculated. The Residual Measurement Error Vector represents the difference between the Actual Measurement Vector and the Calculated Measurement Vector. An Update Vector for a current Device Position Estimate is then computed based on the Residual Measurement Error Vector, the Transmitter Position Estimates, and a previous Device Position Estimate. A determination is made as to whether convergence of the Device Position Estimate toward a target solution is likely. If convergence is not likely, then the Update Vector is adjusted to increase the likelihood of convergence toward the target solution.

The target solution is defined as that solution that results in the minimum value for a metric calculated as a function of the errors that are included in the Residual Measurement Error Vector.

The criteria are normally dependent on the particular algorithm being used to determine the Device Position Estimate. The current Device Position Estimate is updated based on the Update Vector. It should be noted that in one embodiment of the disclosed method and apparatus, the Update Vector is adjusted prior to being used to update the Device Position Estimate.

The Update Vector may be adjusted by: (1) reducing the magnitude of the Update Vector based on a scaling factor, and/or (2) limiting the magnitude of the Update Vector based on the magnitude of a Residual Measurement Error Vector as computed when a determination has been made that convergence is unlikely. The scaling factor may be increased (e.g., doubled) with each detected event indicative of non-convergence (possibly except for the first event).

BRIEF DESCRIPTION OF THE DRAWINGS

The features, nature, and advantages of the disclosed method and apparatus will become more apparent from the detailed description set forth below when taken in conjunction with the drawings in which like reference characters identify correspondingly throughout and wherein.

DETAILED DESCRIPTION

Figure 1:
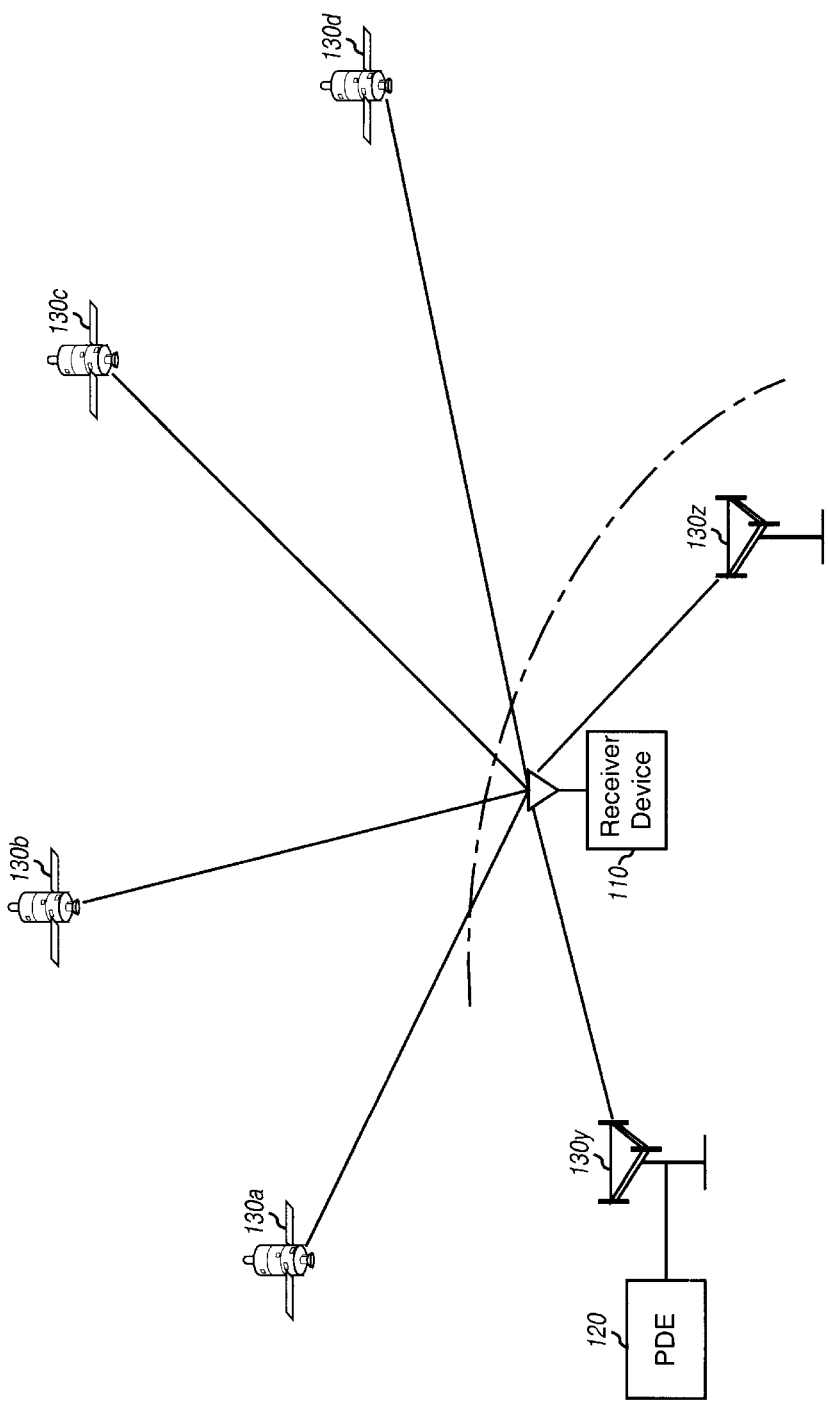
FIG. 1 is a simplified illustration of a system capable of implementing various aspects of the disclosed method and apparatus.

FIG. 1 is a simplified illustration of a system capable of implementing various aspects of the disclosed method and apparatus. A receiver device 110 to be located receives signals transmitted from a plurality of transmitters 130a–130z. Transmitters 130 may be any type of transmitter having locations that are known or that can be ascertained. In one embodiment, transmitters 130 include satellites of a Global Positioning Satellite (GPS) system, such as transmitters 130a–130d in FIG. 1. Transmitters 130 may additionally or exclusively include terrestrial ground-based transmitters, such as transmitters 130y and 130z, which may be base stations of a wireless communication system. Receiver device 110 may thus receive signals from any combination of satellites and/or ground-base transmitters.

In general, receiver device 110 may be any device capable of determining the arrival times of received signals with respect to a reference time. In one embodiment, receiver device 110 is a cellular telephone capable of receiving signals from the plurality of transmitters 130. In other embodiments, receiver device 110 may be a computer terminal having a wireless modem, a stand-alone GPS receiver, a receiver capable of receiving signals from ground-based transmitters, or any other type of receiver.

The position of receiver device 110 may be estimated based on signals received at the device (e.g., such as those transmitted by GPS satellites and/or base stations) and the locations of the transmitters from which the received signals originated. The position of the receiver device may also be estimated based, in part, on a signal transmitted by the device and received at one or more base stations. Thus, any combination of measurements for signals received at or transmitted by the receiver device may be used to estimate the location of the device. For clarity, various aspects and embodiments of the disclosed method and apparatus are described for cases in which the signals are transmitted by the transmitters (e.g., satellites and/or base stations) and received at the receiver device.

Estimates of the position of receiver device 110 (hereafter referred to as "Device Position Estimates") may be derived by the receiver device itself, a Position Determining Equipment (PDE) in the wireless communication system, a base station, or some other entity. The entity performing the position estimate is provided with a set of measurements (hereafter referred to as an "Actual Measurement Vector") and the locations of the transmitters (hereafter referred to as "Transmitter Position Estimates") or the means to determine these locations.

The Transmitter Position Estimates for GPS satellites may be ascertained by processing the signals transmitted by the satellites. Each satellite transmits "Almanac" information, which includes information regarding the coarse location of all satellites in the "constellation". Each satellite further transmits "Ephemeris" information, which includes a higher accuracy version of its own orbit, as tracked and reported by tracking stations on earth. The Transmitter Position Estimates for the base stations may be made known to the entity performing the position estimate for the receiver device. For example, the receiver device may include a database of the Transmitter Position Estimates for the base stations. Alternatively, these Transmitter Position Estimates may be provided by the PDE, or the PDE may calculate the Device Position Estimate and may have the Transmitter Position Estimates for the base stations. The Transmitter Position Estimates for the base stations may also be transmitted via messages.

Transmitters 130 can be used as reference points to determine the Device Position Estimate. By accurately measuring the distances to three transmitters 130 at known locations, the Device Position Estimate can be determined by "trilateration". The distance to each transmitter can be determined by measuring the time required for a signal to travel from the transmitter to the receiver device. If the time the signal is transmitted from the transmitter is known (e.g., stamped into the signal), then the travel time of the signal can be determined by observing the time the signal is received by the receiver device 110 based on the internal clock of the receiver device 110. Typically however, the exact amount of time between transmission and reception cannot be exactly determined because of offsets in the clocks at the transmitter 130 and the receiver device 110. Thus, a "pseudo-range" is typically computed based on the difference between a reference time and the time that the signal is received. The reference time may be any time, as long as the reference time is common to all pseudo-range measurements being made or the pseudo-range measurements can be adjusted to compensate for differences in the reference times used.

Various algorithms can be used to determine the Device Position Estimate based on knowledge of the Transmitter Position Estimates and the Actual Measurement Vector. One such algorithm is a least mean square (LMS) algorithm that performs a number of iterations to arrive at an accurate Device Position Estimate. Each iteration should result in a more accurate Device Position Estimate. However, if the algorithm is not converging, this will not be the case. If provided with accurate range and Transmitter Position Estimates and assuming a relatively small "dilution of precision" (DOP), the LMS algorithm asymptotically converges toward a target solution. However, assuming a large DOP around the target solution, the LMS algorithm may not converge if executed in the normal manner, resulting in an inaccurate solution.

The disclosed method and apparatus determines a Device Position Estimate in cases of large DOP. To determine the Device Position Estimate, an "Actual Measurement Vector" (e.g., a set of measurements, such as measured pseudo-ranges) and Transmitter Position Estimates are provided to an (e.g., LMS) algorithm that initially operates in a normal manner. In cases of large DOP, the solutions from the algorithm may not converge toward a target solution, but may instead overshoot the target solution, causing the algorithm to "oscillate". The presently disclosed method and apparatus detects cases in which convergence is unlikely and adjusts the operation of the algorithm to increase the likelihood of convergence toward the target solution. This results in a greater likelihood of convergence in cases of large DOP, and therefore a more accurate solution.

Figure 2:
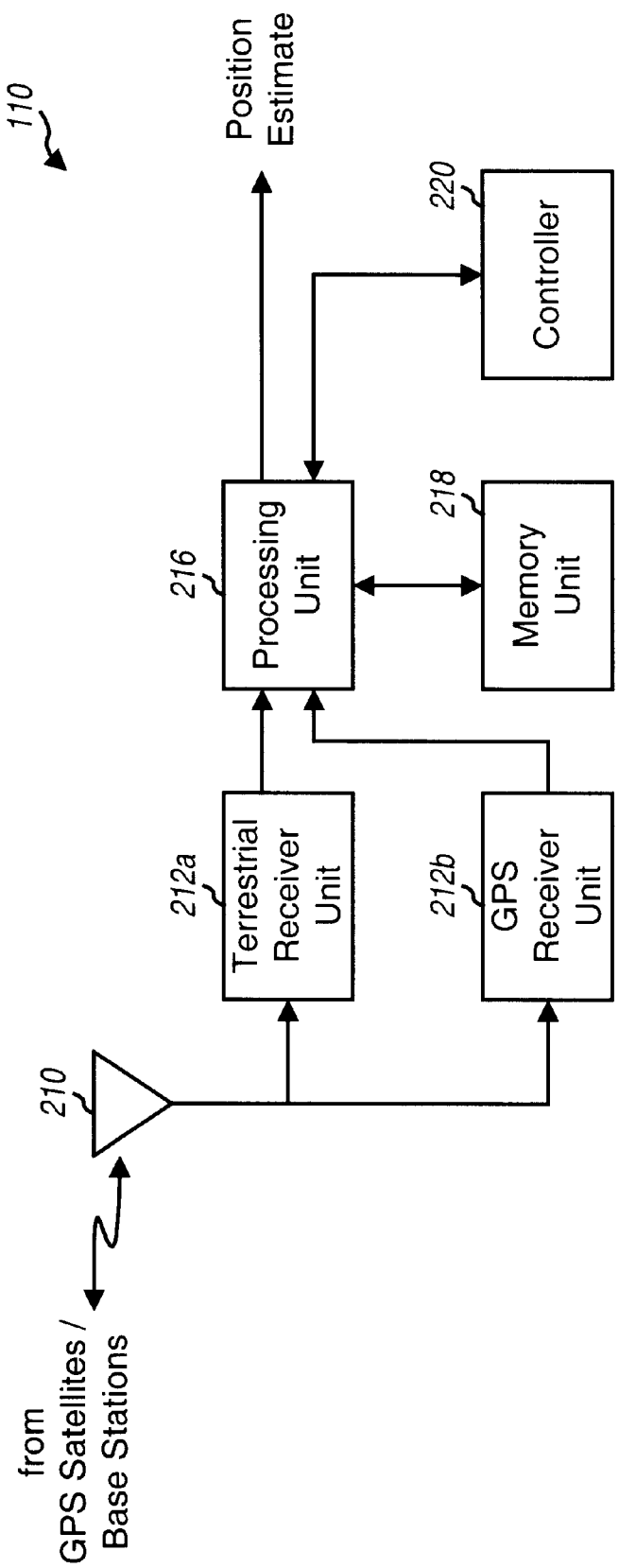
FIG. 2 is a simplified block diagram of a receiver device in accordance with one embodiment of the disclosed method and apparatus.

FIG. 2 is a simplified block diagram of receiver device 110 in accordance with one embodiment of the disclosed method and apparatus. Receiver device 110 may be a component of a terminal in a wireless communication system, such as: (1) a cellular telephone, (2) a computer with a wireless modem, (3) a personal digital assistant, or (4) any other such portable device with a communication capability. Alternatively, receiver device 110 may be a stand-alone position determining unit, such as a stand-alone GPS receiver, which has no communication capability, or a limited communication capability that is only available to assist the position location function of the device.

Receiver device 110 may be designed with the capability to process signals from satellites (such as GPS satellites or other position location satellites), terrestrial ground-base transmitters (e.g., base stations, Loran stations, etc.), or both. In the embodiment shown in FIG. 2, receiver device 110 includes an antenna 210, a terrestrial receiver unit 212a, a GPS receiver unit 212b, a processing unit 216, a memory unit 218, and a controller 220.

Antenna 210 receives signals from transmitters 130 and couples the received signals to terrestrial and GPS receiver units 212a and 212b. Terrestrial receiver unit 212a includes front-end circuitry (e.g., radio frequency (RF) processing circuitry and/or other receiving circuitry) that processes signals transmitted from base stations to derive information used for position determination. Similarly, GPS receiver unit 212b includes front-end circuitry that processes signals transmitted from GPS satellites to derive information used for position determination. Such information from receiver units 212a and 212b may include timing information, the identities and locations of the transmitters whose signals are received, and possibly other information.

The information from receiver units 212 is provided to processing unit 216. Processing unit 216 may initially determine an initial Device Position Estimate and receive from the GPS receiver unit 212b an Actual Measurement Vector. Processing unit 216 then executes the LMS algorithm, which operates on the computed results to arrive at a final Device Position Estimate.

Memory unit 218 stores various data required for determining position. For example, memory unit 218 may store Almanac and/or Ephemeris information that indicates where each of a number of GPS satellites is located in the sky at any given time. Both the Almanac and Ephemeris are valid for a limited amount of time. The Almanac information is considered to be accurate to approximately 3 kilometers for approximately one week from the time the Almanac is transmitted. The Ephemeris provides information regarding the satellite orbit with an accuracy of approximately 1 meter for approximately 2 hours. The error in both the Almanac and Ephemeris grows as the information ages. The satellite locations may be derived from the Almanac and Ephemeris or from other information obtained by GPS receiver unit 212b from signals transmitted from the satellites or by terrestrial receiver unit 212a from signals transmitted via the wireless link.

Controller 220 may receive signaling and/or intermediate results from processing unit 216 and may direct the operation of the processing unit. For example, controller 220 may select the particular types of signals to be processed (e.g., satellite, terrestrial, or both), the particular algorithm to be used (if more than one is available), the parameter values to be used for the selected algorithm, and so on, as described in further detail below.

Although not shown in FIG. 2, receiver device 110 may communicate with a PDE, which may assist in determining the position estimate for the device. The PDE may perform the computations to derive the receiver device position estimate, or may provide certain information used to determine the position estimate (e.g., the location of the GPS satellites and/or base stations).

An iterative algorithm may be used to determine the Device Position Estimate based on (1) Transmitter Position Estimates (e.g., information regarding the locations of GPS satellites and/or base stations) and (2) an Actual Measurement Vector (e.g., a set of pseudo-range measurements to the transmitters). For GPS satellites, the transmitter locations may be ascertained based on current Almanac and/or Ephemeris information.

For clarity, the LMS iterative algorithm is specifically described below. However, other iterative algorithms may also be used to determine the Device Position Estimate in accordance with the disclosed method and apparatus.

Each Transmitter Position Estimate is an estimate of the location of one transmitter. The Transmitter Position Estimate, $\bar{s}_i$, for the i-th transmitter is expressed as:

$$\bar{s}_i = [x_i, y_i, z_i] \text{ and } b_i$$

where the $b_i$ is the clock bias expressed in the same dimension as x, y, and z and further includes the effects of the reference time. The Transmitter Position Estimates, $\bar{s}_i$ for i=1, 2, . . . , n, are ascertained once prior to executing the LMS algorithm and are thereafter used by the algorithm to calculate the Device Position Estimate.

The LMS algorithm may be performed to determine a set of Device Position Estimates resulting in a final Device Position Estimate as follows. For the k-th iteration (where k=1 for the first iteration of the algorithm), the Device Position Estimate, $\bar{u}_k$, is expressed as:

$$\bar{u}_k = [x_{u,k} y_{u,k} z_{u,k} b_{u,k}].$$

Prior to the first iteration, an initial Device Position Estimate, $\bar{u}_0$, is assumed for the receiver device. The value of the initial Device Position Estimate may be selected arbitrarily or based upon current or past knowledge about the position of the receiver device. In one embodiment, the initial Device Position Estimate, $\bar{u}_0$, may be: (1) the last Device Position Estimate (if one is available), (2) the center of the earth, (3) the center of the cell of which the receiver device is receiving the signal, or (4) any other location that provides an initial value to the LMS algorithm. The more accurate the initial Device Position Estimate, the faster the algorithm will convergence toward the target solution. A set of values make up a column vector, $\bar{\rho}_k$, (hereafter referred to as the "Calculated Measurement Vector"). Each value of the Calculated Measurement Vector is a computed measurement associated with one of the transmitters used for position determination. The values of the Calculated Measurement Vector are calculated from: (1) the Transmitter Position Estimates, $\bar{s}_i$, (2) the Device Position Estimate, $\bar{u}_k$, resulting from the k-th iteration of the iterative algorithm. Accordingly, it will be understood that there will be one Calculated Measurement Vector, $\bar{\rho}_k$, associated with each iteration of the iterative algorithm. It should be further understood that these "measurements" are not made, but are calculated for each iteration based on the values of $\bar{s}_i$ and $\bar{u}_k$. In contrast, as will be more fully disclosed below, an Actual Measurement Vector, $\bar{\rho}_a$) is derived from actually measuring the received signals. The elements of the Calculated Measurement Vector, $\bar{\rho}_k$, may be any type of measurement that is a function of the location of the receiver device and the clock bias associated with the transmitters. For example, the elements of the Calculated Measurement Vector may relate to ranges, pseudo-ranges as determined at the receiver device (i.e., r–b, where r is the range and b is the clock bias), reverse pseudo-ranges as determined at the base stations based on signals transmitted from the receiver device (i.e., r+b), range differences as determined based on "time difference of arrival" (TDOA), or a combination thereof. Furthermore, the elements of the Calculated Measurement Vector may be computed by any one of a number of known algorithms. In one embodiment, the elements of the Calculated Measurement Vector, $\bar{\rho}_k$, are pseudo-ranges. One way to compute the elements of the Calculated Measurement Vector is:

$$\rho_{k,i} = \sqrt{(x_{u,k} - x_i)^2 + (y_{u,k} - y_i)^2 + (z_{u,k} - z_i)^2} - (b_{u,k} - b_i), \quad \text{Eq (1)}$$

where each element, $\rho_{k,i}$, of the Calculated Measurement Vector, $\bar{\rho}_k$, is the pseudo-range between the Device Position Estimate, $\bar{u}_k$, for the k-th iteration and the Transmitter Position Estimate, $\bar{s}_i$, for the i-th transmitter.

A geometry matrix H for the Transmitter Position Estimates, $\bar{s}_i$, and the Device Position Estimate, $\bar{u}_k$, is defined as:

$$H_k = \begin{bmatrix} \frac{x_{u,k} - x_1}{|\bar{u}_k - \bar{s}_1|} & \frac{y_{u,k} - y_1}{|\bar{u}_k - \bar{s}_1|} & \frac{z_{u,k} - z_1}{|\bar{u}_k - \bar{s}_1|} & -1 \\ \frac{x_{u,k} - x_2}{|\bar{u}_k - \bar{s}_2|} & \frac{y_{u,k} - y_2}{|\bar{u}_k - \bar{s}_2|} & \frac{z_{u,k} - z_2}{|\bar{u}_k - \bar{s}_2|} & -1 \\ \vdots & \vdots & \vdots & \vdots \\ \frac{x_{u,k} - x_n}{|\bar{u}_k - \bar{s}_n|} & \frac{y_{u,k} - y_n}{|\bar{u}_k - \bar{s}_n|} & \frac{z_{u,k} - z_n}{|\bar{u}_k - \bar{s}_n|} & -1 \end{bmatrix}. \quad \text{Eq (2)}$$

A covariance matrix R of the measurements is defined as:

$$R = E\{\bar{\rho}_a \bar{\rho}_a^T\} - E\{\bar{\rho}_n\} \cdot E\{\bar{\rho}_a^T\}, \quad \text{Eq (3)}$$

where:

$$\bar{\rho}_a = [\rho_{a,1} \rho_{a,2} \cdots \rho_{a,n}]^T$$

where $\bar{\rho}_a$ is the Actual Measurement Vector and $\bar{\rho}_{a,n}$ is the measurement element (e.g., pseudo-range measurement) attained from the signal received from the n-th transmitter. E is the statistical expectation. The superscript T denotes the complex conjugate transpose. The covariance matrix R is typically estimated based on the particular design of the receiver device and the system (e.g., the signal bandwidth or the received signal power).

A "Residual Measurement Error Vector", $\bar{e}_k$, is then defined as:

$$\bar{e}_k = \bar{\rho}_a - \bar{\rho}_k, \quad \text{Eq (4)}$$

As shown in equation (4), the Residual Measurement Error Vector, $\bar{e}_k$, is equal to the difference between the Actual Measurement Vector, $\bar{\rho}_a$, and the Calculated Measurement Vector, $\bar{\rho}_k$. It should be noted that one Residual Measurement Error Vector is calculated for each iteration of the algorithm. The Residual Measurement Error Vector, $\bar{e}_k$, is calculated from the Device Position Estimate, $\bar{u}_k$, determined on the k-th iteration. The next Residual Measurement Error Vector, $\bar{e}_{k+1}$ is then newly calculated for the next iteration from the Device Position Estimate, $\bar{u}_{k+1}$.

An Update Vector, $\Delta \bar{u}_k$, is computed for each iteration based on the geometry matrix H, the covariance matrix R, and the Residual Measurement Error Vector, $\bar{e}_k$, for that iteration. The Update Vector is defined as:

$$\Delta \bar{u}_k = (H^T \cdot R^{-1} \cdot H)^{-1} \cdot H^T \cdot R^{-1} \cdot \bar{e}_k. \quad \text{Eq (5)}$$

This Update Vector represents an estimated error between the current Device Position Estimate, $\bar{u}_k$, and an optimal position estimate. Thus, an updated Device Position Estimate is expressed as:

$$\bar{u}_{k+1} = \bar{u}_k + \Delta \bar{u}_k. \quad \text{Eq (6)}$$

Equations (1) through (6) comprise the computations for one iteration of the LMS algorithm. A number of iterations may be performed to derive a more accurate Device Position Estimate.

In cases of small DOP, if the Transmitter Position Estimates, $\bar{s}_i$, and the Calculated Measurement Vector, $\bar{\rho}_k$, are valid and accurate, then the LMS algorithm will most likely converge after a relatively small number of iterations. Accordingly, the Device Position Estimates provided by the LMS algorithm, $\bar{u}_k$, asymptotically approach the target solution. The target solution is defined as that solution that results in the minimum value for a metric calculated for the target solution. The metric is a function of the errors that are included in the Residual Measurement Error Vector.

However, in cases of large DOP around the target solution, the Update Vector, $\Delta \bar{u}_k$, tends to become disproportionately large compared to the Residual Measurement Error Vector. This then leads to repeated overshoots and oscillation around the target solution. Therefore, the algorithm may not converge on the target solution.

The disclosed method and apparatus (1) determines when the algorithm is unlikely to convergence (e.g., due to oscillation of the LMS solutions around the target solution) and (2) adjusts the algorithm to increase the likelihood of convergence. It should be noted that in normal circumstances in a position determination system, the algorithm typically will convergence to the target solution after a predetermined number of iterations. This number is normally small (e.g., three). However, the typical number of iterations may be greater if the accuracy of the initial Device Position Estimate is poor. If the algorithm requires more iterations than what is typical, then there is less likelihood of convergence and greater likelihood of oscillation around the target solution. Such oscillation can be identified by an inversion in the direction of two consecutive Update Vectors (i.e., 180° change in phase of the Update Vector). Whether the LMS algorithm is likely to converge can be determined by (1) the number of iterations performed without reaching the target solution and (2) changes in the phase of the Update Vector.

To increase the likelihood of convergence, certain parameters of the LMS algorithm can be adjusted. In accordance with one embodiment of the disclosed method and apparatus, the magnitude of the Update Vector is reduced to (1) avoid significant overshoots and (2) adjust the rate at which the position estimate is updated, both of which help to ensure convergence.

Figure 3:
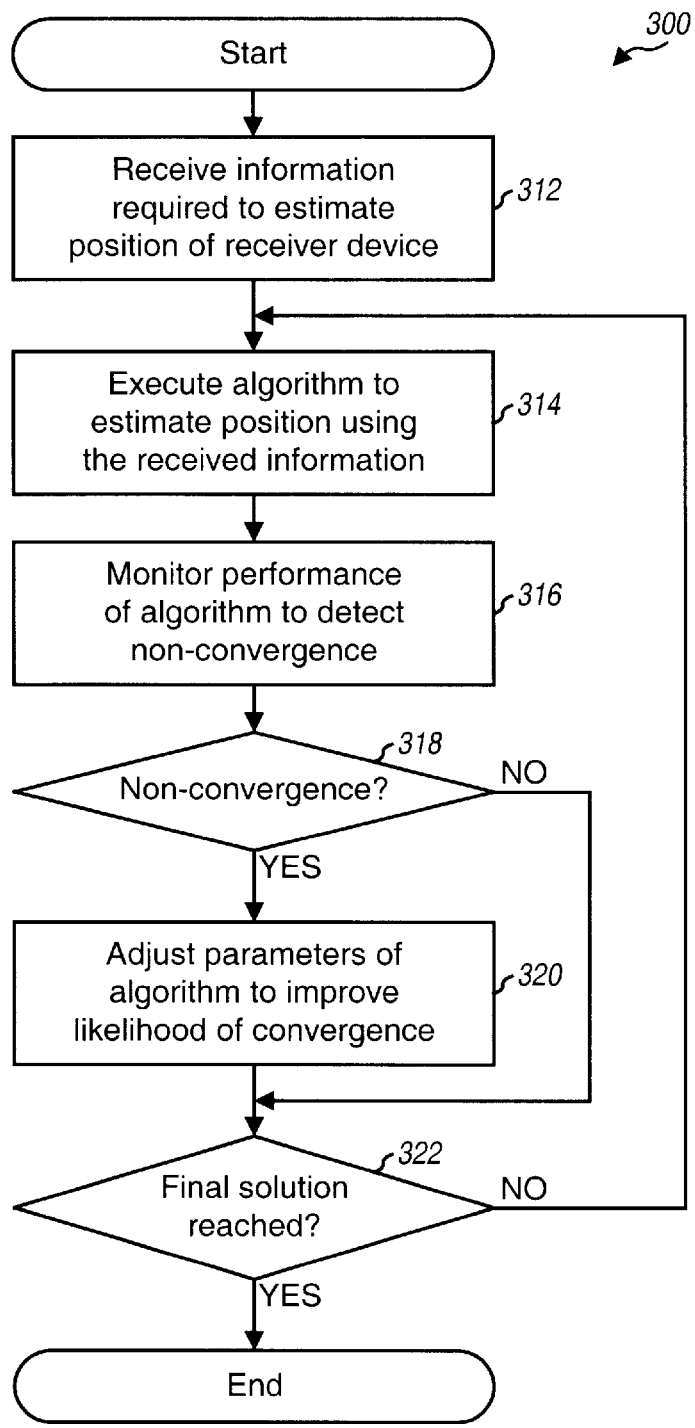
FIG. 3 is a flow diagram illustrating a process to estimate the location of the receiver device, in accordance with one embodiment of the disclosed method and apparatus.

FIG. 3 is a flow diagram illustrating a process 300 for determining the Device Position Estimate in accordance with one embodiment of the disclosed method and apparatus. The information required to determine the Device Position Estimate is initially received, at step 312. This information typically includes the Transmitter Position Estimates and information used to determine the calculated Measurement Vector (e.g., pseudo-range measurements). An iterative algorithm (e.g., an LMS algorithm) is then executed to determine the Device Position Estimate based on the received information, at step 314.

At step 318, a determination is made as to whether convergence is likely. In accordance with one embodiment, a determination that convergence is likely is based on one or more of the following tests. If convergence is unlikely, then one or more parameters of the algorithm may be adjusted to improve the likelihood of convergence, at step 320, as described below. The process then proceeds to step 322. Otherwise, if convergence is likely, as determined in step 318, the process simply proceeds to step 322.

At step 322, a determination is made as to whether or not the process should be terminated. In accordance with one embodiment of the presently disclosed method and apparatus, once the algorithm is terminated, a final Device Position Estimate is determined. The algorithm may be terminated for any one of a number of reasons, such as the maximum number of iterations have been performed, the algorithm has sufficiently converged, etc. In one such embodiment, a final Device Position Estimate is determined if the magnitude of the Update Vector is smaller than a predetermined threshold, indicating that the algorithm has sufficiently converged. If the algorithm has not terminated, then the process of FIG. 3 continues at step 314.

The process shown in FIG. 3 is applicable for any iterative algorithm that may be used to determine position. Steps 314 through 322 may be viewed as comprising one iteration of the iterative algorithm, and any number of iterations may be performed until sufficiently accurate Device Position Estimate is reached. A further discussion of how the likelihood of convergence is determined and the parameters are adjusted is provided below. For the sake of clarity, the disclosed method and apparatus is described below using an LMS algorithm as one example. However, it will be understood by those skilled in the art that other iterative algorithms could be used to calculate an estimate of the location of a receiver device.

Figure 4A:
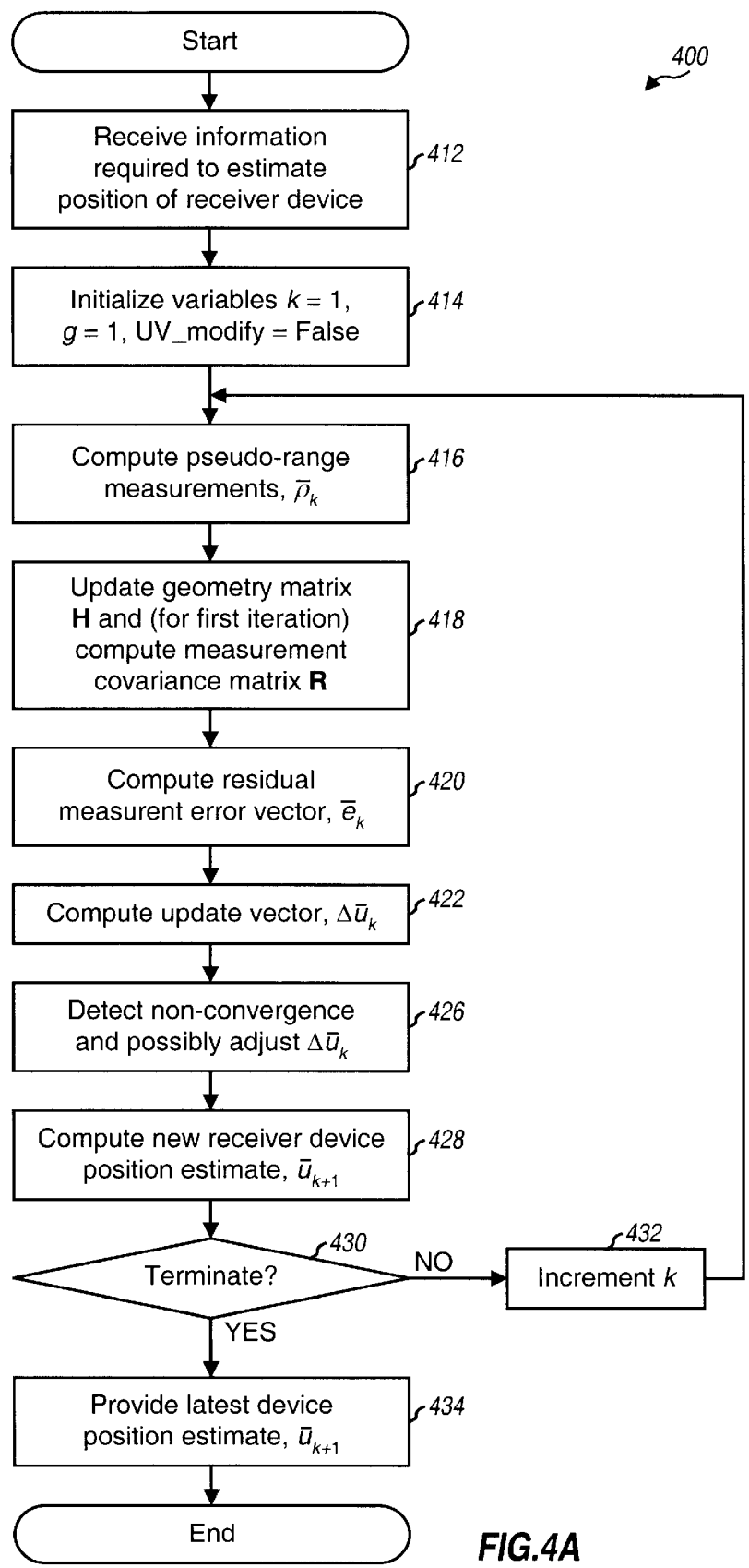
FIG. 4A is a flow diagram illustrating a process performed to estimate the location of the receiver device using an LMS algorithm, in accordance with one embodiment of the disclosed method and apparatus.

FIG. 4A is a flow diagram illustrating a process 400 performed to determine the Device Position Estimate using the LMS algorithm in accordance with one embodiment of the disclosed method and apparatus. The information required to determine the Device Position Estimate is first received at step 412. This information typically includes: (1) the Transmitter Position Estimates, $\bar{s}_i$, (2) the initial Device Position Estimate, $\bar{u}_0$; and (3) the Actual Measurement Vector, $\bar{\rho}_a$. Variables used for the LMS algorithm are then initialized, at step 414. This may entail setting certain variables to their initial values as follows: k=1, g=1, and UV_modify=False, where k is the iteration index, g is a scaling factor used to adjust the magnitude of the Update Vector, $\Delta\bar{u}_k$, and UV_modify indicates whether or not to adjust the Update Vector.

Execution of the LMS algorithm then commences. In the embodiment shown in FIG. 4A, the elements of the Actual Measurement Vector represent pseudo-range measurements. An initial Device Position Estimate is made. A Calculated Measurement Vector is then determined from the initial Device Position Estimate. The Calculated Measurement Vector, $\bar{\rho}_k$, is computed as shown in equation (1), at step 416. Next, the geometry matrix H is updated based on the current Device Position Estimate, $\bar{u}_k$, and the Transmitter Position Estimate, $\bar{s}_i$ as shown in equation (2), at step 418. The measurement covariance matrix R is also derived, at step 418. The Residual Measurement Error Vector, $\bar{e}_k$, is then computed based on the Actual Measurement Vector and the Calculated Measurement Vector as shown in equation (4), at step 420. The Update Vector, $\Delta\bar{u}_k$, is next computed based on the matrices H and R and the Residual Measurement Error Vector, $\bar{e}_k$, as shown in equation (5), at step 422.

At step 426, a determination is made as to whether the LMS algorithm is likely to converge. If not, then one or more parameters of the LMS algorithm and/or the Update Vector, $\Delta\bar{u}_k$, may be adjusted (e.g., reduced in magnitude) to increase the likelihood of convergence by the algorithm. Parameters used to adjust the Update Vector may also be updated in step 426. Methods for determining whether the algorithm is likely to convergence and adjusting the parameters of the LMS algorithm, including the Update Vector, are described below in FIG. 4B.

At step 428, the new Device Position Estimate, $\bar{u}_{k+1}$, for the receiver device is computed based on the current Device Position Estimate, $\bar{u}_k$, and the Update Vector, $\Delta\bar{u}_k$, as shown in equation (6).

A determination is then made as to whether or not the LMS algorithm should be terminated, at step 430. Termination of the algorithm may be triggered based on one or more criteria, such as: (1) the magnitude of the Update Vector, (2) the number of iterations already performed, or a combination thereof. In one embodiment, the algorithm is terminated if the magnitude of the Update Vector is smaller than a particular update threshold (i.e., $|\Delta\bar{u}_k|<\Delta\bar{u}_k\_threshold$) or if the number of iterations already performed exceeds a particular maximum number of iterations (e.g., k>50). If either of these criteria are satisfied, the current Device Position Estimate is considered to be sufficiently accurate, at step 434, and the process terminates. The Device Position Estimate will in fact be accurate if the algorithm has converged. However the Device Position Estimate will not be as accurate as desired if the algorithm has not converged, but rather was terminated due to some other criterion (e.g., the number of iterations exceed the maximum number of iterations). If a termination criterion has not been satisfied, the iteration index k is incremented by one, at step 432, and the process returns to step 416 to perform another iteration.

Steps 416 through 428 comprise one iteration of the LMS algorithm. Any number of iterations may be executed until the termination criterion or criteria are met.

Figure 4B:
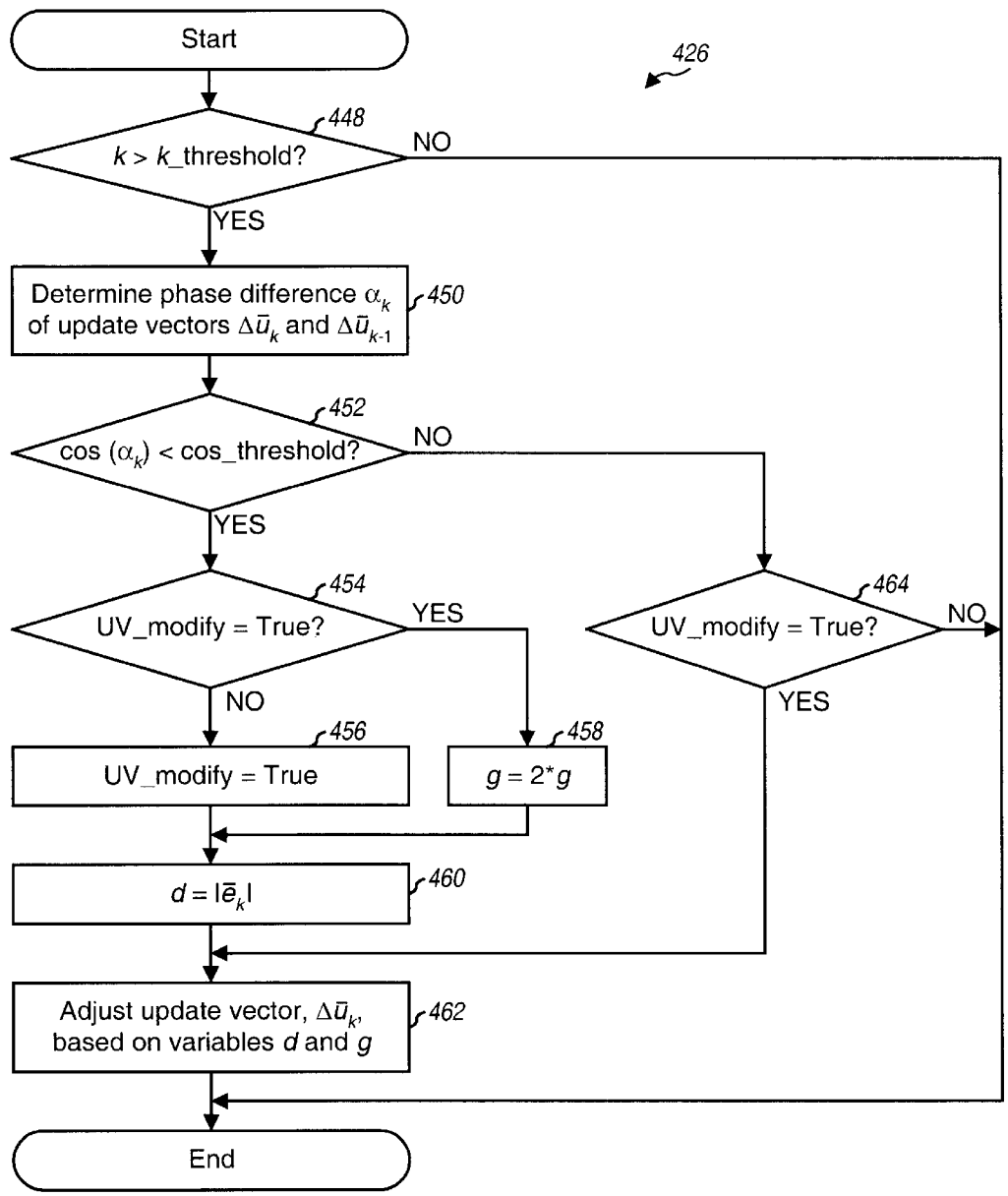
FIG. 4B is a flow diagram of a process to detect non-convergence and adjust parameters of the LMS algorithm, in accordance with one embodiment of the disclosed method and apparatus.

FIG. 4B is a flow diagram of a process to determine whether convergence is likely. Also shown is a process for adjusting parameters of the LMS algorithm in accordance with one embodiment of the disclosed method and apparatus. This process may be used for step 426 in FIG. 4A.

In one embodiment, a determination that convergence of the LMS algorithm is unlikely is in part based on the number of iterations performed without achieving convergence. Convergence is determined by attaining a sufficiently small norm of the Update Vector. As noted above, in normal circumstances in a wireless-assisted GPS position determination system, convergence typically occurs within a small number of iterations. Thus, a determination is made whether the number of iterations performed by the LMS algorithm for this collection of input data exceeds a particular threshold "k_threshold" (i.e., whether k>k_threshold), at step 448. The value of k_threshold is typically selected based on the number of iterations expected to be performed to converge for a typical application (which may be dependent on the accuracy of the initial device position estimate). Alternatively, any value may also be selected that can provide good performance. As a specific example, k_threshold may be set to three. If the number of iterations already performed is greater than k_threshold, the likelihood that convergence by the algorithm will occur is assumed to be low and the process proceeds to step 450 where another test for convergence is performed. Otherwise, if the number of iterations k is less than or equal to k_threshold, a determination is made that the algorithm may yet converge.

In another embodiment, a determination that the LMS algorithm is unlikely to convergence is made by examining the Update Vectors. Convergence is determined to be unlikely when the Device Position Estimates repeatedly overshoot the desired Device Position Estimate. Overshooting by the LMS algorithm causes the set of Device Position Estimates resulting from each iteration to "oscillate" around the desired Device Position Estimate. This oscillation can typically be seen by changes in the direction of the Update Vector essentially along the line that is coincident with the direction of the largest DOP. When such phase reversals occur, the phase difference α between two consecutive Update Vectors is close to 180°. This results in the cosine of the phase difference α being close to minus one. In one embodiment, reversal in the direction of the Update Vector is detected if the cosine of α is less than a particular negative cos_threshold. As a specific example, cos_threshold may be selected as −0.95.

As part of step 450, the cosine of the phase difference α of two consecutive Update Vectors is computed. This cosine is computed by performing a dot product of the two most recent Update Vectors, which can be expressed as:

$$\cos(\alpha_k) = \frac{<\Delta \tilde{u}_k, \Delta \tilde{u}_{k-1}>}{|\Delta \tilde{u}_k| \cdot |\Delta \tilde{u}_{k-1}|}, \quad \text{Eq (7)}$$

where $\Delta \tilde{u}_k$ represents the first three components of the Update Vector $\Delta \bar{u}_k$ (i.e., $\Delta \tilde{u}_k = [\Delta x_{u,k} \, \Delta y_{u,k} \, \Delta z_{u,k}]$) and $<\Delta \tilde{u}_k, \Delta \tilde{u}_{k-1}>$ denotes a dot product of the first three components of the two Update Vectors, which can be expressed as:

$$<\Delta \tilde{u}_k, \Delta \tilde{u}_{k-1}> = (\Delta x_i \cdot \Delta x_{i-1}) + (\Delta y_i \cdot \Delta y_{i-1}) + (\Delta z_i \cdot \Delta z_{i-1}).$$

A determination is then made as to whether the cosine of the phase difference is less than the cos_threshold, (i.e., $\cos(\alpha_k)<\cos\_\text{threshold}$), at step 452. If the answer is yes, then a phase reversal has been detected.

In one embodiment, the first time a phase reversal in the Update Vector is detected after the number of iterations exceeds k_threshold, a variable UV_modify is set to True. Each subsequent time the phase reversal is detected, the factor g is multiplied by a positive factor greater than unity (e.g., two). This larger value for the factor g is then used to effectively divide the magnitude of the Update Vector by a corresponding amount. The adjusted Update Vector may be smaller than optimal, and under normal operating conditions this smaller Update Vector would lead to a slower convergence rate. However, for unstable scenarios, the smaller Update Vector ensures that, given a sufficient number of iterations, the LMS algorithm has a greater likelihood of convergence. It should be noted that many other methods could be implemented for reducing the size of the Update Vector in response to such phase reversals. In one example of such an alternative, the number of phase reversals does not correspond to the amount the Update Vector is reduced. Rather the Update Vector is reduced by a predetermined amount each time a reduction is made.

In one embodiment, the norm of the Update Vector is set to the norm of the Residual Measurement Error Vector at the time a phase reversal is detected. This is achieved by setting a variable d to the magnitude of the Residual Measurement Error Vector (i.e., $d=|\bar{e}_k|$) each time the phase reversal is detected. This variable d is thereafter used to determine the magnitude of the Update Vector, as described below.

For the embodiments described above, a parameter of the LMS algorithm (e.g., the Update Vector) may be continually (i.e., "adaptively") adjusted based on the monitored performance of the algorithm. In one such embodiment, such an "adaptive" adjustment is achieved based on the values of the variable d and the factor g. Thus, in such an embodiment, once the variable UV_modify has been set to True and regardless of whether or not a phase reversal has been detected, the Update Vector is adjusted by the variable d and factor g, as described below. These actions are performed by the following steps.

If a phase reversal of the Update Vector was detected at step 452, a determination is made whether the variable UV_modify has been set to True, at step 454. If the answer is no, indicating that this is the first phase reversal detected, then the variable UV_modify is set to True, at step 456. Otherwise, if UV_modify has already been set to True by a previously detected phase reversal, then the factor g is increased (e.g., doubled), at step 458. In either case, the variable d is set to the magnitude of the Residual Measurement Error Vector, at step 460. The Update Vector is then adjusted based on the variable d and factor g, at step 462.

In one embodiment, the Update Vector is adjusted as follows:

$$\Delta \bar{u}_k = \frac{\Delta \bar{u}_k \cdot d}{|\Delta \bar{u}_k| \cdot g}. \qquad \text{Eq (8)}$$

As shown in equation (8), the adjusted Update Vector retains the phase of the original Update Vector, but its norm is set to the magnitude of the Residual Measurement Error Vector at the time the last phase reversal was detected (as captured by the variable d) and further reduced by the factor g. The adjusting ensures that the magnitude of the Update Vector is smaller each time the phase reversal is detected, since the amount of overshoot is less each time. In this manner, the step size can be made dependent on the monitored performance of the LMS algorithm. Moreover, by increasing (e.g., doubling) the factor g each time a phase reversal is detected, the size of the Update Vector is correspondingly reduced. After adjusting the Update Vector at step 462, the process terminates.

If a phase reversal of the Update Vector was not detected at step 452, a determination is made at to whether the variable UV_modify has been set to True, at step 464. If the answer is no, indicating that the LMS may be taking longer to converge, but no oscillation in the Update Vector has been detected, then the process terminates. Otherwise, if UV_modify has already been set to True by a previous detected phase reversal, then the Update Vector is adjusted based on the current values for the variable d and factor g, at step 462. In the embodiment shown in FIG. 4B, the Update Vector is adjusted by the variable d and factor g for each iteration, once UV_modify has been set to True, regardless of whether or not phase reversal of the Update Vector has been detected.

For clarity, FIGS. 4A and 4B illustrate examples of the disclosed method for performing the LMS algorithm. However, these examples may also be applied to other algorithms used to determine the Device Position Estimate. For clarity, FIGS. 4A and 4B also describe a specific implementation for determining that convergence is unlikely based on the number of iterations and the Update Vectors. Also described is an example of one method by which the LMS algorithm can be adjusted to improve the likelihood of convergence. It should be noted that these methods are merely presented as examples of ways to determine whether convergence is likely and to adjust the parameters of the LMS algorithm. Other methods are clearly possible and would be understood by those skilled in the art from the examples provided herein.

In FIG. 2, the elements of receiver device 110 (e.g., processing unit 216 and controller 220) may be implemented as a digital signal processor (DSP), an application specific integrated circuit (ASIC), a processor, a microprocessor, a controller, a microcontroller, a field programmable gate array (FPGA), a programmable logic device, other electronic unit, or any combination thereof designed to perform the functions described herein. Certain aspects of the disclosed method and apparatus may be implemented in hardware, software, or a combination of both. For example, the processing to determine the Device Position Estimate (e.g., the LMS algorithm) may be performed based on program codes stored within memory unit 218 and executed by a processor (processing unit 216 or controller 220 in FIG. 2). Alternatively, such processing may be performed by dedicated hardware or some combination of hardware and software.

The previous description of the disclosed embodiments is provided to enable any person skilled in the art to make or use the presently disclosed method and apparatus. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for determining an accurate device position estimate, comprising:

executing an iterative algorithm to provide a device position estimate, wherein the iterative algorithm is based on an initial device position estimate, transmitter position estimates for a plurality of transmitters, and an actual measurement vector;

determining whether convergence of the iterative algorithm is likely;

if convergence of the iterative algorithm is unlikely, adjusting at least one parameter of the iterative algorithm to increase the likelihood of convergence;

calculating an update vector for a current device position estimate based on a Residual Measurement Error Vector, the Transmitter Position Estimates, and the most recent Device Position Estimate calculated by the iterative algorithm;

calculating the norm of the update vector; and wherein convergence is determined to be unlikely based on the value of the norm of the update vector.

2. A method for determining an accurate device position estimate, comprising:

executing an iterative algorithm to provide a device position estimate, wherein the iterative algorithm is based on an initial device position estimate, transmitter position estimates for a plurality of transmitters, and an actual measurement vector;

determining whether convergence of the iterative algorithm is likely;

if convergence of the iterative algorithm is unlikely, adjusting at least one parameter of the iterative algorithm to increase the likelihood of convergence;

calculating an update vector for a current device position estimate based on a Residual Measurement Error Vector, the Transmitter Position Estimates, and the most recent Device Position Estimate calculated by the iterative algorithm, wherein a function of the Residual Measurement Vector is included in a metric;

calculating the norm of the update vector; and wherein convergence is determined to be unlikely based on the value of the norm of the update vector.

3. A method for determining an accurate device position estimate, comprising:

executing an iterative algorithm to provide a device position estimate, wherein the iterative algorithm is based on an initial device position estimate, transmitter position estimates for a plurality of transmitters, and an actual measurement vector;

determining whether convergence of the iterative algorithm is likely;

if convergence of the iterative algorithm is unlikely, adjusting at least one parameter of the iterative algorithm to increase the likelihood of convergence;

calculating an update vector for a current device position estimate based on a Residual Measurement Error Vector, the Transmitter Position Estimates, and the most recent Device Position Estimate calculated by the iterative algorithm, wherein a function of the Residual Measurement Vector is included in a metric and wherein the function is linear;

calculating the norm of the update vector; and wherein convergence is determined to be unlikely based on the value of the norm of the update vector.

4. A method for determining an accurate device position estimate, comprising:

executing an iterative algorithm to provide a device position estimate, wherein the iterative algorithm is based on an initial device position estimate, transmitter position estimates for a plurality of transmitters, and an actual measurement vector;

determining whether convergence of the iterative algorithm is likely;

if convergence of the iterative algorithm is unlikely, adjusting at least one parameter of the iterative algorithm to increase the likelihood of convergence;

calculating an update vector for a current device position estimate based on a Residual Measurement Error Vector, the Transmitter Position Estimates, and the most recent Device Position Estimate calculated by the iterative algorithm, wherein a function of the Residual Measurement Vector is included in a metric and wherein the function is quadratic;

calculating the norm of the update vector; and wherein convergence is determined to be unlikely based on the value of the norm of the update vector.

5. A method for determining a device position estimate, comprising:

determining transmitter position estimates for a plurality of transmitters and measuring an actual measurement vector for the transmitters;

determining an initial device position estimate;

determining a calculated measurement vector based on the transmitter position estimates and the initial device position estimate;

revising the device position estimate based on the difference between the calculated measurement vector, and the actual measurement vector;

determining that convergence of the current device position estimate toward a final device position estimate is unlikely; and if convergence is determined to be unlikely, adjusting the manner in which the revised device position estimate is determined to increase the likelihood of convergence.

6. The method of claim 5, wherein the revised device position estimate is calculated using a least mean square (LMS) algorithm.

7. The method of claim 5, wherein the difference between the calculated measurement vector, and the actual measurement vector is a residual measurement vector, and the manner for determining the revised device position estimate is adjusted by scaling a value derived from the residual measurement error vector.

8. The method of claim 7, wherein the value derived from the residual measurement error vector is an update vector.

9. The method of claim 5, further comprising:

determining a geometry matrix based on the current device position estimate and the transmitter position estimate; and determining a measurement covariance matrix, and wherein the adjustment is further based on the geometry matrix and the measurement covariance matrix.

10. The method of claim 5, further comprising:

repeating the steps of claim 5 iteratively until either the iterative algorithm converges to a final device position estimate, or a determination is made that convergence is unlikely.

11. The method of claim 5, wherein the step of adjusting the device position estimate includes:

determining a scaling factor which effects the amount of the adjustment to the device position estimate.

12. The method of claim 11, wherein the scaling factor is increased with each iteration during which convergence is determined to be unlikely.

13. The method of claim 12, wherein the convergence is determined to be unlikely based on phase reversals in the update vector.

14. The method of claim 12, wherein the scaling factor is not increased in response to the first predetermined number of iterations resulting in a determination that convergence is unlikely.

15. The method of claim 8, further including:

limiting the magnitude of the update vector based on the magnitude of a residual measurement error vector as computed when a determination has been made that convergence is unlikely.

16. The method of claim 10, wherein non-convergence is detected based in part on the number of iterations performed without reaching the target position estimate.

17. The method of claim 16, wherein non-convergence is further detected based on the update vector.

18. The method of claim 17, wherein non-convergence is detected if the number of iterations exceeds a first threshold and a phase difference between two consecutive updates for two iterations is less than a second threshold.

19. The method of claim 18, wherein the phase difference between two consecutive updates is derived by performing a dot product on the two consecutive updates.

20. The method of claim 10, further comprising:

providing the current device position estimate as a final position estimate for the device if one or more criteria for termination are met.

21. The method of claim 20, wherein the one or more criteria for termination are met if the number of iterations exceeds a first threshold.

22. The method of claim 20, wherein the one or more criteria for termination are met if magnitude of the update is within a second threshold.

23. The method of claim 5, wherein the actual measurement vector corresponds to pseudo-ranges indicative of distances between the device and the transmitters.

24. The method of claim 5, wherein the transmitters are satellites in a Global Positioning Satellite (GPS) system.

25. The method of claim 5, wherein the transmitters include base stations in a wireless communication system.

26. The method of claim 25, wherein the wireless communication system is a CDMA system.

27. A computer program product for determining the location of a device, comprising:

code for receiving position estimates for a plurality of transmitters and initial measurements for the transmitters;

code for computing an update for a current device position estimate based on the Transmitter Position Estimates, the current device position estimate, and the initial measurements, wherein the current device position estimate is initially set to an initial estimate for the location of the device;

code for detecting non-convergence of the current device position estimate toward a target position estimate;

code for, if non-convergence is detected, adjusting the update to increase likelihood of convergence to the target position estimate;

code for updating the current device position estimate based on the update; and a data storage medium configured to store the codes.

28. A receiver device comprising:

at least one receiver unit configured to receive and process a plurality of signals from a plurality of transmitters to derive initial measurements for the transmitters; and a processor coupled to the at least one receiver unit and configured to receive the initial measurements and position estimates for the transmitters, compute an update for a current device position estimate based on the transmitters position estimates, the current device position estimate, and the initial measurements, wherein the current device position estimate is initially set to an initial estimate for the location of the device, detect non-convergence of the current device position estimate toward a target position estimate, if non-convergence is detected, adjust the update to increase likelihood of convergence to the target position estimate, update the current device position estimate based on the update, and repeat the compute, detect, adjust, and update for a plurality of iterations.

29. The receiver device of claim 28, wherein the processor is further configured to scale the update by a scaling factor to reduce magnitude of the update, wherein the scaling factor is increased based on detected events indicative of non-convergence.

* * * * *